April 27, 1954 J. W. WEST Re. 23,819
NAVIGATION INSTRUMENT
Original Filed Dec. 8, 1948
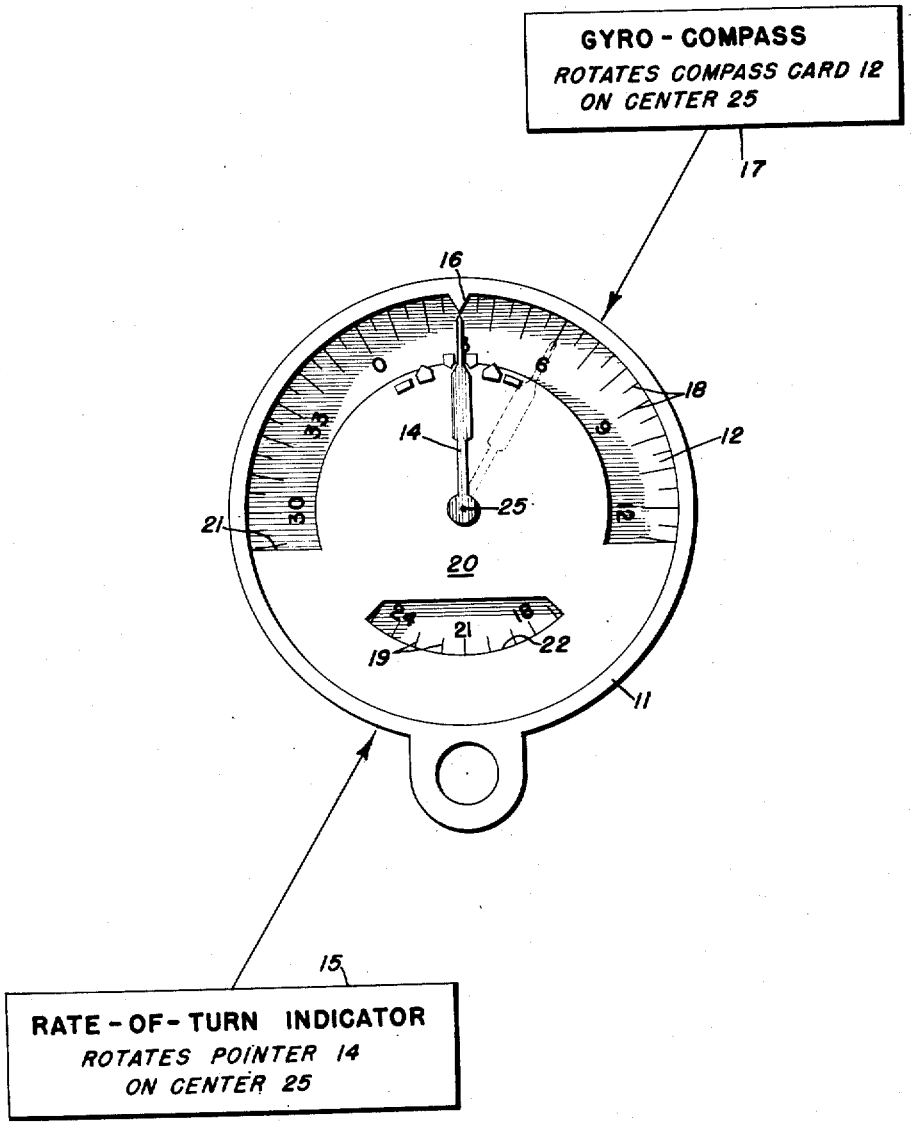
INVENTOR
JUSTON W. WEST
BY G. D. O'Brien
C. Baxter Warner
ATTORNEYS Reissued Apr. 27, 1954 Re. 23,819

UNITED STATES PATENT OFFICE 23,819

NAVIGATION INSTRUMENT

Juston W. West, United States Navy

Original No. 2,593,509, dated April 22, 1952, Serial No. 64,064, December 8, 1948. Application for reissue August 21, 1953, Serial No. 375,849

3 Claims. (Cl. 116—129)

(Granted under Title 35, U. S. Code (1952), sec. 266)

Matter enclosed in heavy brackets [ ] appears in the original patent but forms no part of this reissue specification; matter printed in italics indicates the additions made by reissue.

The invention described herein may be manufactured and used by or for the Government of the United States of America for governmental purposes without the payment of any royalties thereon or therefor.

The present invention pertains to the art of navigation, and it is embodied in an instrument for navigating a navigable vehicle. More particularly, the disclosed embodiment of the invention may be used in an aircraft, and comprises a flight control instrument by means of which the navigator or pilot of the vehicle is guided in a turn when he desires to change the course of the aircraft, and thereby is better able to direct the flight of the aircraft on the desired course.

An object of the invention is to provide an indicating instrument that combines the indicating features of a gyro-compass and a rate-of-turn indicator.

Another object of the invention is to provide a flight instrument in which the indicator hand of a rate-of-turn indicator is mounted for registration with the compass card of a gyro-compass.

The single figure of the drawing is a frontal view of an instrument that constitutes a preferred embodiment of the invention, the view being partially schematic.

The instrument of the disclosure comprises a casing 11 which may be installed in any conventional manner in a navigable vehicle such as an aircraft for example, and preferably the casing 11 is mounted on the instrument panel of the aircraft. The casing 11 houses the compass card 12, which is rotatable on center 25 in accordance with conventional practice to maintain a position in which it points toward and indicates north. According to conventional modern practice the compass card 12 is driven to rotate by means of a gyro-compass [13], illustrated diagrammatically in the drawing at 17.

Rotation of the compass card 12 is with reference to the vehicle in which the gyro-compass 17 is installed, and with reference to the casing or housing 11 for the compass card, the housing 11 being secured in the vehicle as [usaul] *usual* in fixed position on the instrument panel. The compass card 12 comprises an arcuate scale of [indica] *indicia* 18 divided into angular increments. In the instrument specifically disclosed, which is familiar to pilots, navigators and the like personnel engaged in the operation of aircraft, there are two similar and corresponding arcuate scales 18 and 19 of indicia, which are concentric and are radially displaced with reference to each other, the scales 18 and 19 being coaxial with the axis 25 of rotation of the compass card.

The housing 11 comprises the face 20 which masks arcuate portions of the two scales 18 and 19, and comprises windows 21 and 22 that leave a portion only of each of the scales 18 and 19 exposed, the portions of the several scales 18 and 19 exposed by windows 21 and 22 respectively being on respective opposite sides of the center 25 of compass card 12. The window 21 comprises the pointer 16 which is positioned on the housing 11 to indicate the heading of the aircraft, and is positioned with reference to the compass card 12 to sweep the scale 18. The pointer 16 being fixed with reference to the vehicle, and the "0" mark of the scale 18 being always directed towards the geographic north, the indicium of scale 18 to which the pointer 16 is directed indicates the geographic heading of the vehicle.

Within casing 11 is a rate-of-turn indicator hand or pointer 14, which is rotatable on the center 25 of the compass card 12, and of the scale 18 which it sweeps, the pointer 14 being driven to rotate with reference to the pointer 16. [Drive of the pointer 14 is by whatever apparatus is contained in the vehicle to navigate it and steer it along the desired course. In the case of the disclosed aircraft navigation for example, pointer 14 is connected with the rudder and the rudder control, as is indicated diagrammatically at 15.]

[The compass 17 that operates the compass card 12, and mechanism 15 that drives the rotatable pointer 14, may be in close proximity to the instrument housing 11, or may be positioned at a remote location of the aircraft, and connected respectively with the compass card 12 and the movable pointer 14 in conventional manner for remote operation.] *The rate-of-turn indicator hand 14 is actuated in response to rate of turn of the aircraft by means of a conventional rate-of-turn indicator 15 that is diagrammatically shown. Gyrocompass 17 and rate-of-turn indicator 15 can be directly associated with casing 11 or, if desired, gyrocompass 17 and rate-of-turn indicator 15 can be disposed in remote locations in the aircraft and connected in conventional manner for remote-control operation with casing 11.*

Pointer 14 positioned to register with the fixed pointer 16 indicates that the aircraft is headed as desired on a straight [course, and that there is no rudder control. Pointer 16 is operated under rudder control to rotate by an amount that indicates the magnitude of rudder control that is applied by the pilot to make a turn for the desired change of] course.

In operation with an aircraft in flight, pointer 16 points to an indicium of the scale 18 of the compass card 12 which indicates the heading of the aircraft. If the aircraft is flying a straight course and is not turning, the rate-of-turn indicator hand 14 is in registration with fixed pointer 16. For example, as shown in the drawing, fixed pointer 16 registers with compass card 12 to indicate a heading of 30° to the east of north. Rate-of-turn indicator hand 14, as shown in its solid line position, is in registration with pointer 16, and indicates that the aircraft is flying a straight course and is not turning.

In the event that the pilot of the aircraft desires to execute a turn, he operates the rudder control in the usual manner for the desired turn. The rate-of-turn indicator hand 14 thereby is angularly displaced away from pointer 16 in the direction corresponding to the direction of turn instituted by the pilot. The pilot sets the magnitude of rudder control for making a turn in accordance with the rate of turn he desires for the particular navigation undertaken. If the pilot wishes to turn sharply, he sets a greater magnitude of rudder control than when he desires a slower turn. [The degree of displacement of pointer 14 from the pointer 16 varies in accordance with the magnitude of turn control instituted by the pilot, and therefore the angular displacement of the pointer 14 away from the fixed pointer 16 is a measure of the rate of turn of the aircraft.] For example, as shown in the drawing, the dotted line position of rate-of-turn indicator hand 14 shows that the aircraft is executing a turn to the right, and the fact that the rate-of-turn indicator hand 14 is angularly displaced away from fixed pointer 16 to a relatively great degree indicates that a relatively rapid turn is being executed.

As the turn instituted by the pilot progresses, the compass card 12 rotates relative to the case 11, and relative to the fixed pointer 16, in accordance with the changing direction of flight, and the direction of flight currently at any time during the execution of the turn is thereby indicated on the scale 18 by the pointer 16. When the pointer 16 approaches the new direction of flight desired by the pilot for which he executed the turn, [the pilot changes the turn control towards straight course, and he so navigates the aircraft until the fixed pointer 16 indicates the desired new direction of flight. By operating the turn controls towards straight course, the rate-of-turn pointer 14 rotates away from its dotted line position towards registry with fixed pointer 16, and] the pilot operates the rudder control *toward straight course* to bring the pointer 14 into registry with the fixed pointer 16 at the same time when the pointer 16 indicates the desired new direction of flight on the compass card 12.

The flight instrument of the present invention may be used to maintain flight along a straight course by keeping the rate-of-turn indicator hand 14 in registration with [pointer 16] *the course desired* through rudder action. If the aircraft yaws, the rate-of-turn indicator hand 14 and the compass card 12 move out of registration with fixed pointer 16 in opposite directions, and correction for the yaw to bring the aircraft back on proper course is easily effected by applying rudder control that operates to bring the rate-of-turn indicator hand 14 back into registration with the proper course. With this procedure the proper course is regained or retained by the pilot's single action and thought of keeping the indicator hand 14 on the proper course indication of the compass card 12.

If it is desired to change the course of the aircraft, a properly executed turn may be made through rudder action by angularly displacing rate-of-turn indicator hand 14 from registration with pointer 16 and the original course marking of compass card 12 to a new position with respect to compass card 12 corresponding with the new course. For example, referring to the drawing, assume that the aircraft is flying a straight course along a heading of 30° and it is desired to turn the aircraft into a new heading of 60°. The original course of 30° is indicated by the pointer 16 registering with the 30° marking on compass card 12, and the fact that a straight course is being flown is indicated by the rate-of-turn indicator hand 14 being in the full line position of the drawing in registry with pointer 16. To execute the turn and bring the aircraft into the desired new course, the aircraft is given right rudder sufficiently so that rate-of-turn indicator hand 14 is displaced [angularly into the dotted line position of registration with the 60° marking of compass card 12, and the rudder control is held to maintain the movable pointer 14 in this position] *clockwise with respect to index 16 into a position, such as the dotted line position, that corresponds to the rate of turn it is desired to execute.* As the aircraft gradually turns into the new heading, the compass card 12 rotates counter-clockwise and the pointer 16 progresses in a clockwise direction with respect to compass card 12 until it is in registration with the 60° marking of compass card 12. While the turn progresses towards and approaches the desired 60° heading, as indicated by fixed pointer 16 approaching the 60° marking of compass card 12, the pilot applies rudder control towards rudder position of straight course that operates to swing the pointer 14 counter-clockwise, and he times this straightening rudder control to bring the pointers 14 and 16 in registry with each other at the same time [when pointer 16 indicates the desired new 60° course on the compass card 12, which indicates straight flight on the desired new heading.] *by maintaining the pointer 14 in registry with the 60° marking on card 12 as it progresses toward pointer 16. By this process the rate of turn decreases as the 60° marking and pointer 14 approach pointer 16 bringing the three together without overrun.*

I claim:

1. In a navigation instrument for a navigable vehicle, a compass card rotatable to hold a position that indicates north and comprising a coaxial arcuate scale of indicia divided into angular increments, a pointer positioned with reference to the compass card to sweep the scale of indicia and positioned fixed with reference to the vehicle to indicate its heading, a pointer rotatable relative to the compass card on an axis coaxial therewith to sweep the scale, the rotatable pointer being rotatable relative to the fixed pointer in accordance with the [magnitude of turning control imposed upon the vehicle to steer it to a new course] *rate of turn of the vehicle.*

*2. In a navigation instrument for a navigable vehicle, a compass card rotatable to hold a position that indicates north and comprising an arcuate scale of indicia divided into angular increments rotatable about an axis, a pointer positioned with reference to the compass card to sweep the scale of indicia and positioned fixed with reference to the vehicle to indicate its head-*

*ing, a pointer rotatable relative to the compass card on an axis coaxial therewith to sweep the scale, and means for setting the rotatable pointer at a distance on said scale relative to the fixed pointer commensurate with the rate of turn of said vehicle.*

*3. A navigation instrument for a vehicle comprising a support adapted to be mounted on the vehicle and provided with a stationary index, a compass having a compass card rotatably mounted on the support for movement about an axis relative to the index to indicate the heading of the vehicle, and a rate-of-turn measuring instrument having a rate-of-turn indicator mounted*

*to swing about the axis of rotation of the compass card and displaceable by said measuring instrument relative to said stationary index responsive to the rate of turn of the vehicle.*

References Cited in the file of this patent or the original patent

UNITED STATES PATENTS

| Number | Name | Date |
|---|---|---|
| 1,900,709 | Henderson | Mar. 7, 1933 |
| 2,276,717 | Codebecq | Mar. 17, 1942 |
| 2,413,214 | Carlson | Dec. 24, 1946 |